US010904025B2

(12) United States Patent
Kochura et al.

(10) Patent No.: US 10,904,025 B2
(45) Date of Patent: Jan. 26, 2021

(54) WEB MEETING BOOKMARKING SYSTEM BASED ON LEVEL OF RELEVANCY AND IMPORTANCE

(71) Applicant: INTERNATIONAL BUSINESS MACHINES CORPORATION, Armonk, NY (US)

(72) Inventors: Nadiya Kochura, Bolton, MA (US); Jonathan D. Dunne, Dungarvan (IE); Alex Xingqi Casella, Cambridge, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 16/431,053

(22) Filed: Jun. 4, 2019

(65) Prior Publication Data
US 2020/0389334 A1    Dec. 10, 2020

(51) Int. Cl.
| | | |
|---|---|---|
| *G06F 15/16* | (2006.01) | |
| *H04L 12/18* | (2006.01) | |
| *G06K 9/62* | (2006.01) | |
| *G06F 16/955* | (2019.01) | |
| *G06F 16/901* | (2019.01) | |

(52) U.S. Cl.
CPC ........ *H04L 12/1831* (2013.01); *G06F 16/901* (2019.01); *G06F 16/9562* (2019.01); *G06K 9/6215* (2013.01); *G06K 9/6276* (2013.01)

(58) Field of Classification Search
CPC .............. H04L 12/1831; G06F 16/901; G06F 16/9562; G06K 9/6215; G06K 9/2276

USPC .......................................................... 709/204
See application file for complete search history.

(56) References Cited

U.S. PATENT DOCUMENTS

| | | | |
|---|---|---|---|
| 6,941,321 B2* | 9/2005 | Schuetze | G06F 16/355 |
| 7,298,930 B1* | 11/2007 | Erol | G06K 9/00711 |
| | | | 382/305 |
| 8,805,929 B2* | 8/2014 | Erol | G06F 16/9562 |
| | | | 709/204 |

(Continued)

FOREIGN PATENT DOCUMENTS

JP        2004266831 A        9/2004

OTHER PUBLICATIONS

Slimani, "Description and Evaluation of Semantic similarity Measures Approaches", International Journal of Compute Applications 80(10):25-33, Oct. 2013, 10 pages, Published by Foundation of Computer Science, New York, USA.

(Continued)

*Primary Examiner* — Alan S Chou
(74) *Attorney, Agent, or Firm* — Kenneth Han

(57) ABSTRACT

A method, computer system, and computer program product for collaborative document relations modeling are provided. The embodiment may include parsing, by a processor, content of a web conference recording document utilizing multi-modal analysis. The embodiment may also include deriving a social meeting bookmark model based on the multi-modal analysis to combine results of the multi-modal analysis into a matrix. The embodiment may further include generating bookmarks of the parsed content based on the derived social meeting bookmark model and the matrix. The embodiment may also include storing the bookmarks and the social meeting bookmark model in a database.

20 Claims, 6 Drawing Sheets

(56) References Cited

U.S. PATENT DOCUMENTS

| | | |
|---|---|---|
| 8,914,452 B2 | 12/2014 | Boston |
| 9,729,571 B1 | 8/2017 | Ferguson |
| 10,673,913 B2* | 6/2020 | Weber ................. H04L 65/4053 |
| 2008/0069011 A1* | 3/2008 | Sekaran ............. H04L 65/4038 |
| | | 370/260 |
| 2012/0209841 A1 | 8/2012 | Saretto et al. |
| 2013/0167039 A1* | 6/2013 | Howell ............... G06F 16/9535 |
| | | 715/748 |
| 2014/0172419 A1 | 6/2014 | John et al. |
| 2014/0358936 A1* | 12/2014 | Chan ................. G11B 27/3063 |
| | | 707/746 |
| 2016/0171391 A1* | 6/2016 | Guo ................. G06F 16/24573 |
| | | 706/12 |
| 2016/0277518 A1* | 9/2016 | Grant .................... G06N 7/005 |
| 2018/0146021 A1 | 5/2018 | Cai et al. |
| 2019/0341050 A1* | 11/2019 | Diamant ............ G06K 9/00288 |

OTHER PUBLICATIONS

Mell et al., "The NIST Definition of Cloud Computing", National Institute of Standards and Technology, Special Publication 800-145, Sep. 2011, pp. 1-7.

* cited by examiner

WEB MEETING BOOKMARKING SYSTEM BASED ON LEVEL OF RELEVANCY AND IMPORTANCE

BACKGROUND

The present invention relates, generally, to the field of computing, and more particularly to web conferencing systems.

Web conferencing systems allow real-time point-to-point communications as well as multicast communications from one sender to many receivers. Users can hold live meetings, training events, lectures or presentations through a web conferencing system on TCP/IP connections. Web conferencing systems also allow data streams of text-based messages and voice and video chat to be shared simultaneously. Users can connect to the web conferencing system by telephone or using a user computer's speakers and microphone through a VoIP connection. Typically, either a software needs to be downloaded and installed or a web-based application needs to be launched in a user's browser. Today, many web conferencing vendors provide the central connectivity and meeting "ports" or "seats" as a hosted web service.

SUMMARY

According to one embodiment, a method, computer system, and computer program product for collaborative document relations modeling are provided. The embodiment may include parsing, by a processor, content of a web conference recording document utilizing multi-modal analysis. The embodiment may also include deriving a social meeting bookmark model based on the multi-modal analysis to combine results of the multi-modal analysis into a matrix. The embodiment may further include generating bookmarks of the parsed content based on the derived social meeting bookmark model and the matrix. The embodiment may also include storing the bookmarks and the social meeting bookmark model in a database.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
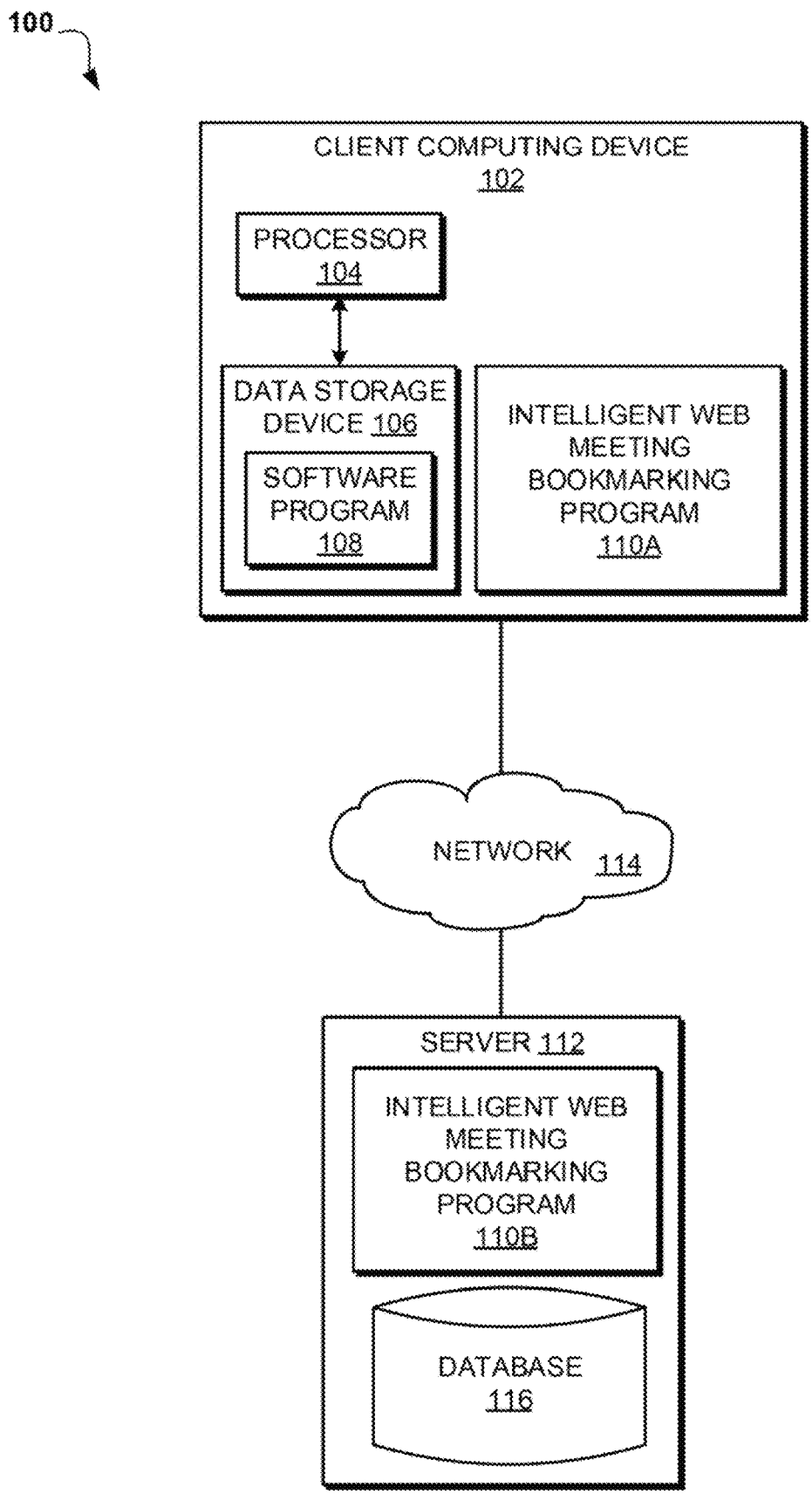
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to web conferencing systems. The following described exemplary embodiments provide a system, method, and program product to perform multi-modal analysis of meeting content and user skill sets to derive a social meeting bookmark model (SMBM). Therefore, the present embodiment has the capacity to improve the technical field of web conferencing systems by evaluating meeting content and creating recording markers or bookmarks that are specific to a user based on the analyzed relevancy and importance score and prompting the markers to the user in different colors depending on the relevancy and the importance, thereby allowing users to determine which part of the recorded meeting is important and needs to be focused or re-accessed later.

As previously described, web conferencing systems allow real-time point-to-point communications as well as multicast communications from one sender to many receivers. Users can hold live meetings, training events, lectures or presentations through a web conferencing system on TCP/IP connections. Web conferencing systems also allow data streams of text-based messages, voice and video chat to be shared simultaneously. Users can connect to the web conferencing system by telephone or using a user computer's speakers and microphone through a VoIP connection. Typically, either a software needs to be downloaded and installed or a web-based application needs to be launched in a user's browser. Today, many web conferencing vendors provide the central connectivity and meeting "ports" or "seats" as a hosted web service.

Web conferencing systems may be seen as a convenient way to hold a meeting via the internet and share meeting content in text with multiple groups. However, problems may arise when an individual needs to attend different meetings within a short time frame or needs to multitask during meetings. In such situations, it may be difficult to keep track of all meeting information. As such, it may be advantageous to, among other things, implement a system capable of bringing important information from the meetings to the user's attention by replaying the key information to the user when the user needs to go through web conference recordings and allowing the user to go through such information within the same contextual environment.

According to one embodiment, an intelligent web meeting bookmarking program may perform a multi-modal analysis of meeting content and user skill sets. In at least one other embodiment, the intelligent web meeting bookmarking program may generate a social meeting bookmark model and intelligent media bookmarks. According to one other embodiment, the intelligent web meeting bookmarking program may assign different colors to each marker and prompt the colored markers to a user.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for evaluating meeting content and user skill sets and generating a social meeting bookmark model.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an intelligent web meeting bookmarking program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an intelligent web meeting bookmarking program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the intelligent web meeting bookmarking program 110A, 110B may be a program capable of performing topic analysis and content distance analysis of web meeting content. The intelligent web meeting bookmarking program 110A, 110B may also combine the results of the analysis in the form of a matrix to provide a model representing an overall level of relevancy of content to a user. The intelligent web meeting bookmarking program 110A, 110B may further utilize the model to create content bookmarks in different colors depending on the level of relevancy and importance. The intelligent web meeting bookmarking process is explained in further detail below with respect to FIG. 2.

Figure 2:
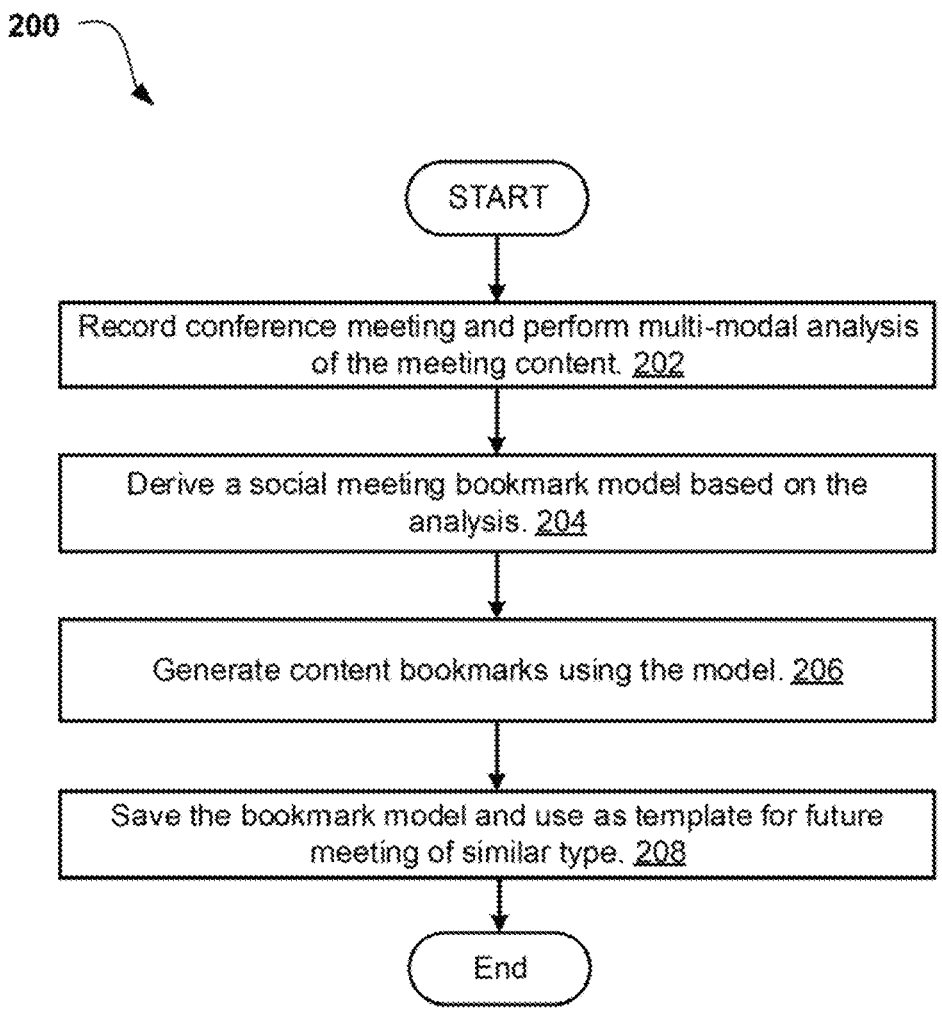
FIG. 2 is an operational flowchart illustrating an intelligent web meeting bookmarking process according to at least one embodiment.

FIG. 2 is an operational flowchart illustrating an intelligent web meeting bookmarking process 200 according to at least one embodiment. At 202, the intelligent web meeting bookmarking program 110A, 110B records conference meetings and performs multi-modal analysis of the meeting content. According to one embodiment, the intelligent web meeting bookmarking program 110A, 110B segments the recorded meeting content using varying input feature sets. For example, the intelligent web meeting bookmarking program 110A, 110B may segment the content based on presenters' turns if there are multiple presenters or hosts during a web meeting. The intelligent web meeting bookmarking program 110A, 110B may also segment the content based on the topics discussed or presented during a conference, utilizing voice recognition technologies or topic analysis technologies. The intelligent web meeting bookmarking program 110A, 110B may further analyze and segment visual content if the type of content involves live demonstration using a whiteboard and drawings. In at least one other embodiment, the intelligent web meeting bookmarking program 110A, 110B may ingest documents shared during a meeting, such as word processing or text documents, spreadsheets, presentations, images, PDFs, videos, or maps. The intelligent web meeting bookmarking program 110A, 110B may also perform topic analysis and analyze content distance of recorded content. In at least one embodiment, the intelligent web meeting bookmarking program 110A, 110B may also utilize a known distance analysis method, such as cosine distance or Jaccard similarity for topic analysis and similarity analysis. The intelligent web meeting bookmarking program 110A, 110B may further utilize various video segmentation techniques. For example, the video segmentation techniques may be based on video content and may include determining one or more segments into which to divide video content, dividing the video content into the determined number of segments identifying a boundary frame associated with each of the segments, and adjusting the respective boundary frame associated with a first segment of the segments to generate an adjusted boundary frame associated with the first segment where the adjusting is based on and one or more entity representations associated with the adjusted boundary frame.

At 204, the intelligent web meeting bookmarking program 110A, 110B derives a social meeting bookmark model based on the analysis. According to one embodiment, the intelligent web meeting bookmarking program 110A, 110B may provide a matrix of semantic content similarity classifiers that computes the similarity score between content to evaluate the overall level of relevancy to a user. The intelligent web meeting bookmarking program 110A, 110B may apply the similarity classifier for both meeting content segments and user-specific data. The similarity classifier may represent similarity-based classification utilizing similarity learning technologies. Such technologies may include supervised machine learning in artificial intelligence. It may be closely related to regression and classification, learning from examples of a similarity function that measures how similarly two objects are related. It may have applications in ranking, recommendation systems, visual identity tracking, face verification and speaker verification. The intelligent web meeting bookmarking program 110A, 110B may build semantic similarity classifiers utilizing known techniques such as structure-based measures, information content measures, feature-based measures, and hybrid measures. The intelligent web meeting bookmarking program 110A, 110B may then utilize the user-specific data to evaluate the level of relevancy to the user and to calculate the relevancy score.

User-specific data may include content similarity scores between the user's most recent posts and previously viewed documents and meeting content calculated by the semantic content similarity classifier. The user-specific data may further include a user project role, source control management systems associated with the meeting content, specific content or recorded voice mentioning the user name and the user project, user emails, and user's explicit settings.

The intelligent web meeting bookmarking program 110A, 110B may then apply the calculated relevancy score for each meeting segment. In one other embodiment, the intelligent web meeting bookmarking program 110A, 110B may evaluate the importance of the meeting content based on further analysis. Such further analysis may be based on monitoring communications exchanged during a web conference (e.g. speech communication, text communication, eye focus area, hand gestures from users, etc.), analyzing the sentiment of the communication, and classifying the meeting content based on the urgency or importance using natural language classifiers.

At 206, the intelligent web meeting bookmarking program 110A, 110B generates content bookmarks using the generated model. According to one embodiment, the intelligent web meeting bookmarking program 110A, 110B may annotate a recording of a web conference and assign bookmarks to the conference recording segments based on the level of relevancy and importance. The intelligent web meeting bookmarking program 110A, 110B may create bookmarks in the web conference's frameset with different color codes based on the importance and relevancy score. The bookmarks may be overlaid in a visual way within the web conference and user graphical interface. For example, on a web conference user interface, the intelligent web meeting bookmarking program 110A, 110B may display a frameset using a bar-shaped graph with different color codes assigned to each content segments, such as project discussion with the importance and relevancy score of 0.78 in red color, descriptive statistic approach with the score of 0.14 in blue color, and discussion of follow-up questions with the score of 0.59 in orange color. Red coloring may be assigned to very important and relevant segments exceeding a pre-configured minimum importance and relevancy score. Blue or green coloring may be assigned to less important or relevant segments with scores below a pre-configured maximum importance and relevancy score. The intelligent web meeting bookmarking program 110A, 110B may allow users to select different markers in the generated frameset when the users need to replay the web conference recording.

At 208, the intelligent web meeting bookmarking program 110A, 110B saves the bookmark model and uses it as a template for future meetings of similar type. According to one embodiment, the intelligent web meeting bookmarking program 110A, 110B may allow a user to modify the annotated bookmarks and save the change along with the originally created bookmarks in the server 116. The intelligent web meeting bookmarking program 110A, 110B may use the saved bookmark as a template for the similar type of meeting to be held within a pre-configure timeframe. For example, if a user is involved in a particular project and expects to participate in a status update meeting every Monday, the intelligent web meeting bookmarking program 110A, 110B may provide the template with the user so that the user may want to focus on a certain portion of the meeting after being recorded. The intelligent web meeting bookmarking program 110A, 110B may also use the saved bookmark and the model as a basis for non-similar meetings but related to similar topics, so that the intelligent web meeting bookmarking program 110A, 110B does not have to re-compute or perform analysis from cold-start.

Figure 3:
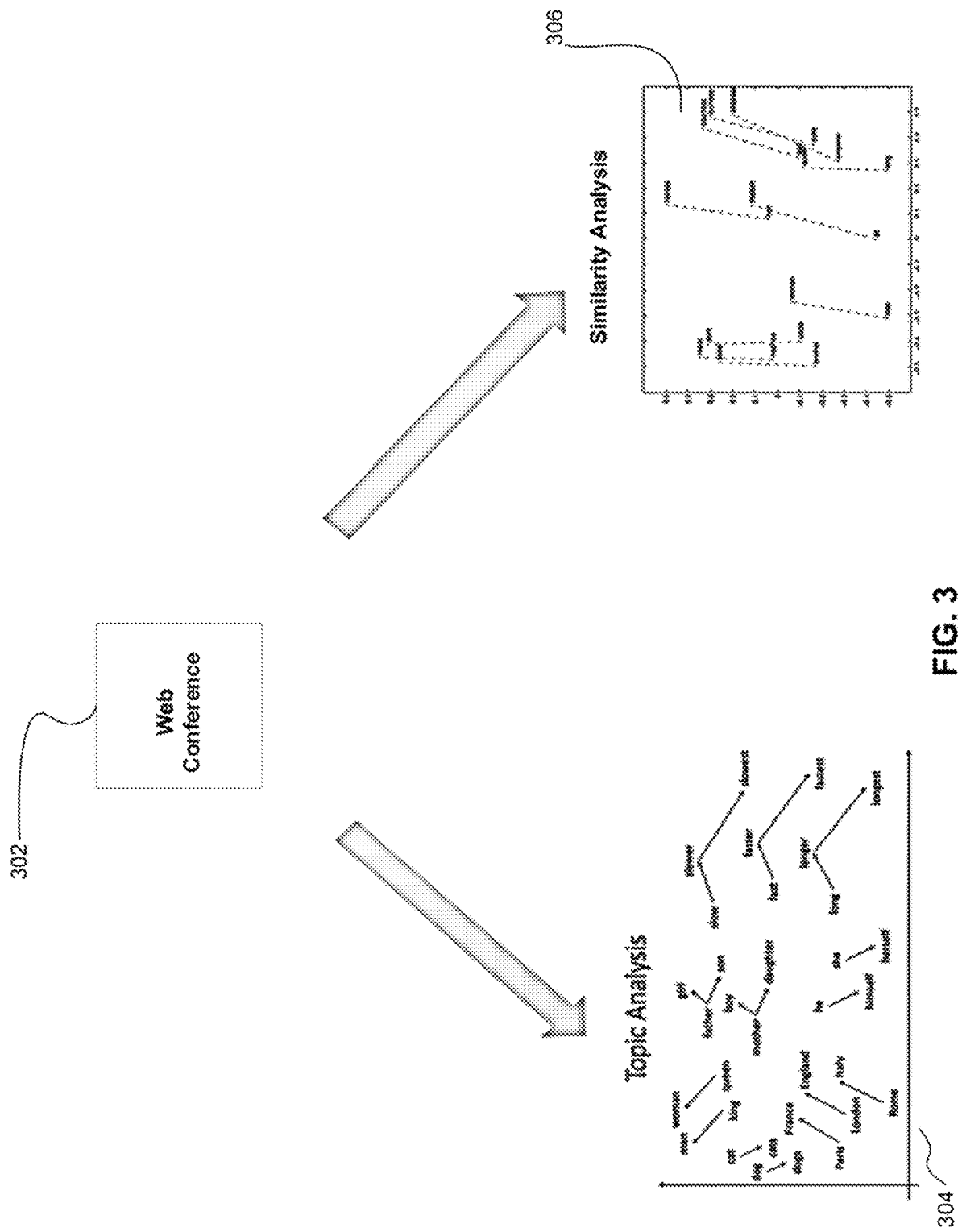
FIG. 3 is a block diagram showing an exemplary topic and distance analysis process using an intelligent web meeting bookmarking platform according to at least one embodiment.

Referring now to FIG. 3, a block diagram showing an exemplary topic and distance analysis process using an intelligent web meeting bookmarking platform is depicted according to at least one embodiment. According to one embodiment, the intelligent web meeting bookmarking program 110A, 110B may record a web conference 302 and parse the conference content. Based on the parsing, the intelligent web meeting bookmarking program 110A, 110B may perform a topic analysis 304 and a similarity analysis 306. The intelligent web meeting bookmarking program 110A, 110B may generate and display a graph showing topical relationships of various keywords. For example, a topic analysis graph depicted in FIG. 3 may graphically describe topical relationships between keywords such as "man" and "king "or "long", "longer" and "longest", the intelligent web meeting bookmarking program 110A, 110B may also generate and display a similarity analysis graph depicting a Euclidian similarity distance between certain keywords in numeric values.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the intelligent web meeting bookmarking program 110A, 110B may store an annotated bookmark model in a database of a web conference server or in a physical user device, such as smartphones or tablets.

Figure 4:
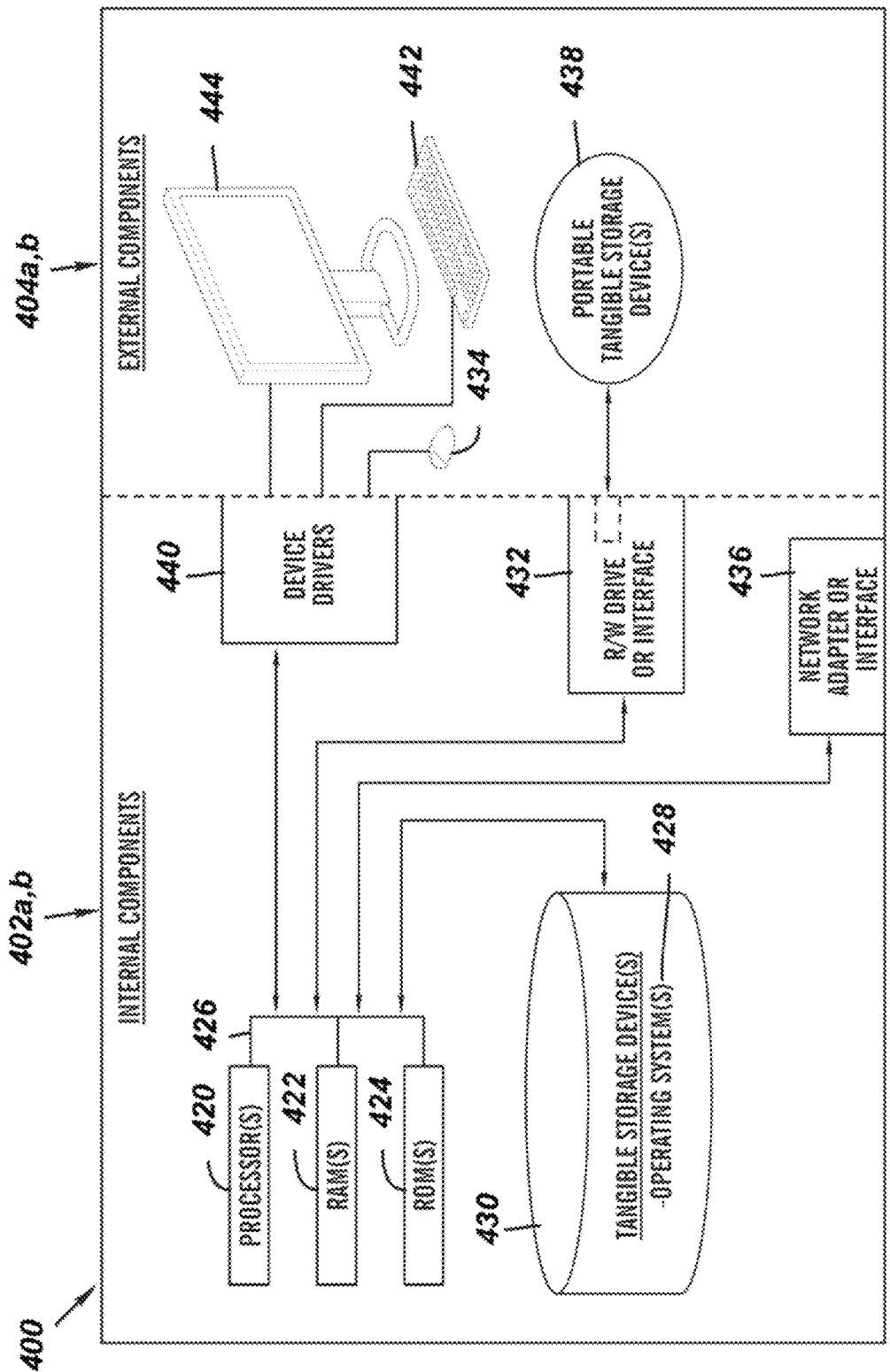
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 408 and the intelligent web meeting bookmarking program 110A in the client computing device 102 and the intelligent web meeting bookmarking program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as an intelligent web meeting bookmarking program 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the intelligent web meeting bookmarking program 110A in the client computing device 102 and the intelligent web meeting bookmarking program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the intelligent web meeting bookmarking program 110A in the client computing device 102 and the intelligent web meeting bookmarking program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
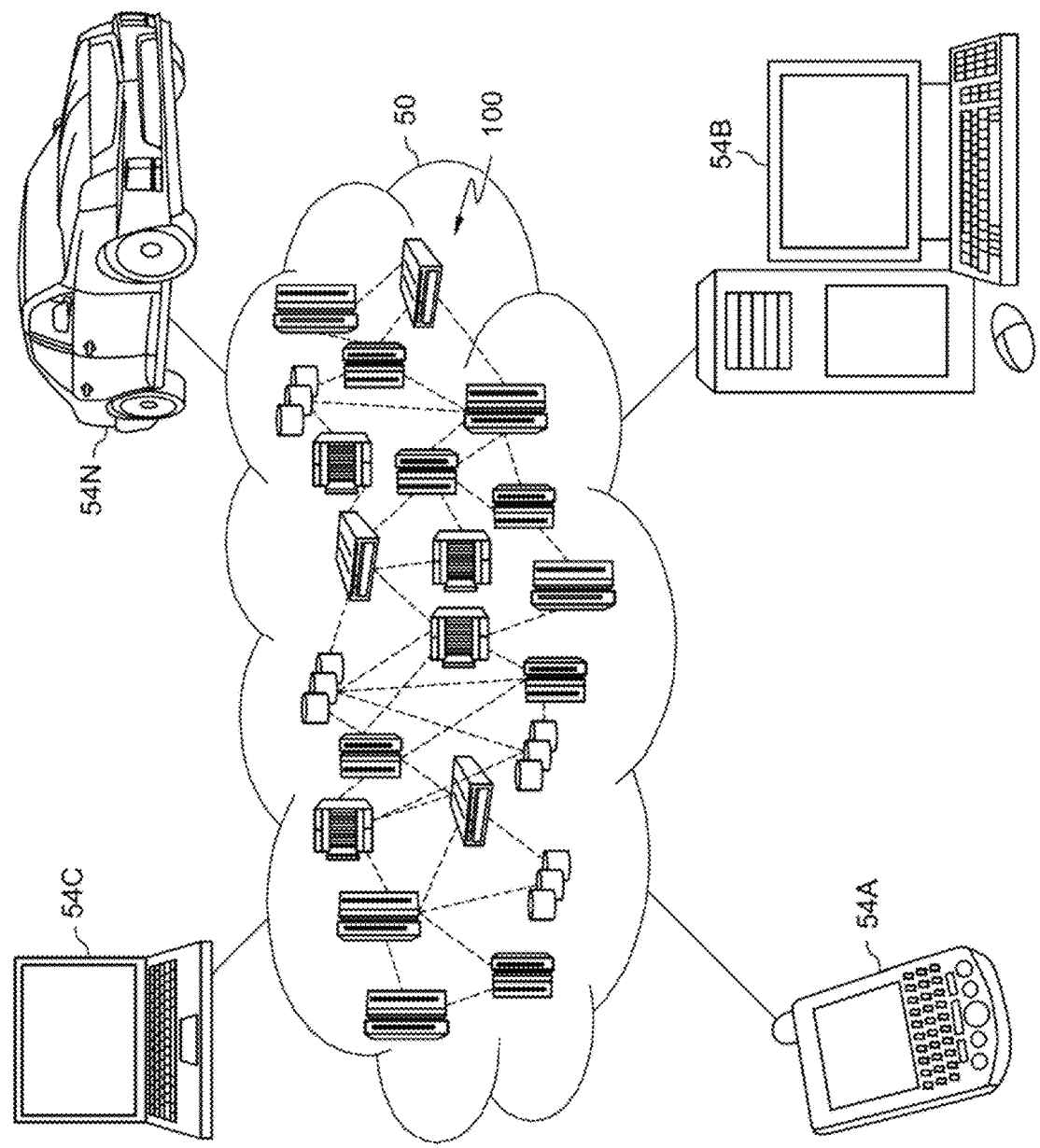
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
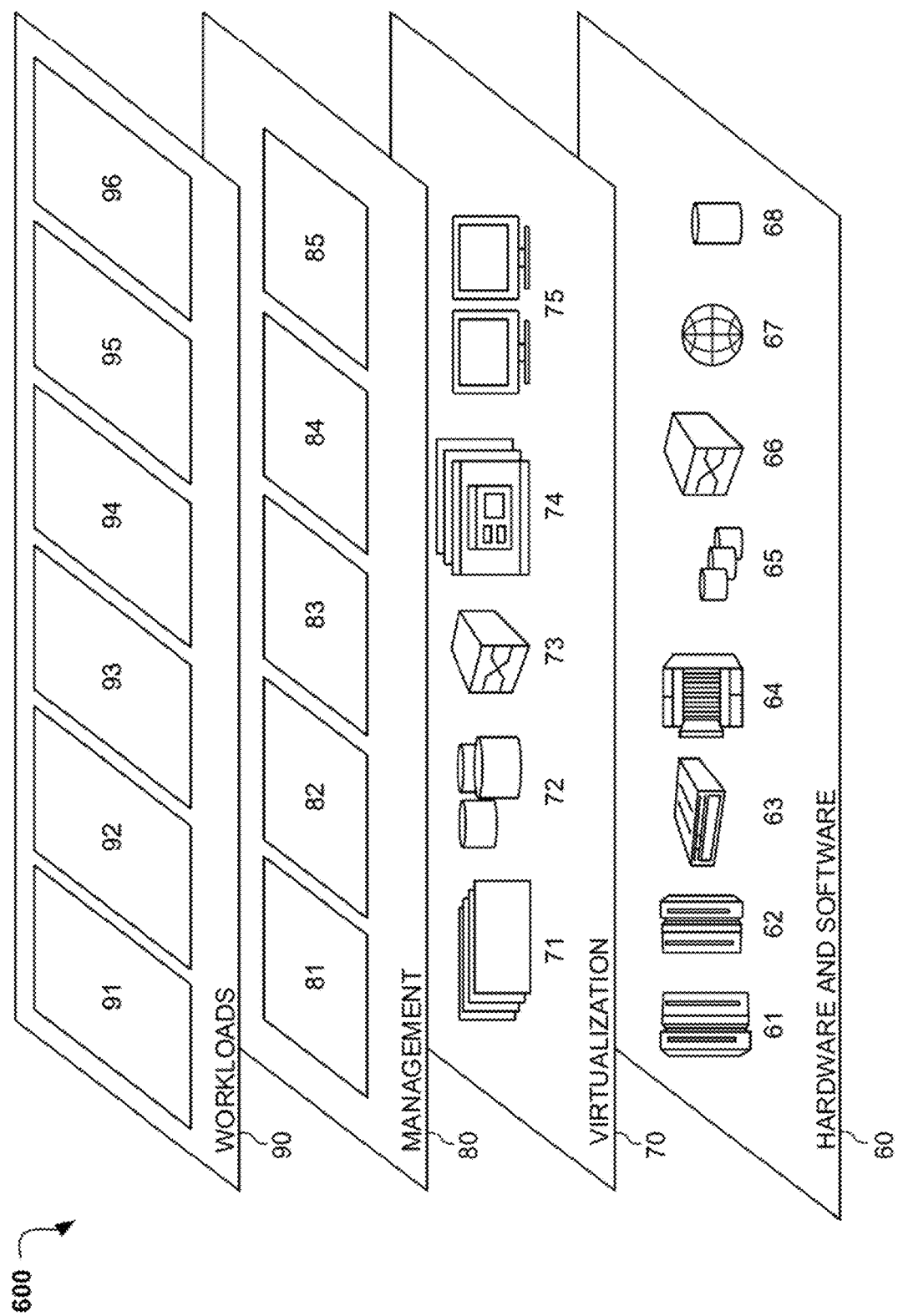
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent web meeting bookmarking 96. Intelligent web meeting bookmarking 96 may relate to deriving a social meeting bookmark model from a web conference recording.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for intelligent web conference bookmarking, the method comprising:
   parsing, by a processor, content of a web conference recording document utilizing multi-modal analysis;
   deriving a social meeting bookmark model based on the multi-modal analysis to combine results of the multi-modal analysis into a matrix;
   generating bookmarks of the parsed content based on the derived social meeting bookmark model and the matrix; and
   storing the bookmarks and the social meeting bookmark model in a database.

2. The method of claim 1, further comprising:
   displaying the bookmarks on a graphical user interface of a web conference application.

3. The method of claim 1, wherein the multi-modal analysis includes topic analysis and similarity analysis.

4. The method of claim 1, further comprising:
   calculating cosine differences of topics found in the content of the web conference recording to determine relationships between the topics.

5. The method of claim 1, further comprising:
   generating the bookmarks at segments within the content that are within a threshold relevancy and an importance score to a user based on a user skill set.

6. The method of claim 1, further comprising:
   evaluating a level of relevancy of the content of the web conference recording to a user; and
   assigning different colors to the bookmarks based on pre-configured ranges of relevancy and importance scores.

7. The method of claim 1, further comprising:
prompting a user to access segments of the content through user interaction with the generated bookmarks on a graphical user interface.

8. A computer system for intelligent web conference bookmarking, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
parsing, by a processor, content of a web conference recording document utilizing multi-modal analysis;
deriving a social meeting bookmark model based on the multi-modal analysis to combine results of the multi-modal analysis into a matrix;
generating bookmarks of the parsed content based on the derived social meeting bookmark model and the matrix; and
storing the bookmarks and the social meeting bookmark model in a database.

9. The computer system of claim 8, further comprising:
displaying the bookmarks on a graphical user interface of a web conference application.

10. The computer system of claim 8, wherein the multi-modal analysis includes topic analysis and similarity analysis.

11. The computer system of claim 8, further comprising:
calculating cosine differences of topics found in the content of the web conference recording to determine relationships between the topics.

12. The computer system of claim 8, further comprising:
generating the bookmarks at segments within the content that are within a threshold relevancy and an importance score to a user based on a user skill set.

13. The computer system of claim 8, further comprising:
evaluating a level of relevancy of the content of the web conference recording to a user; and
assigning different colors to the bookmarks based on pre-configured ranges of relevancy and importance scores.

14. The computer system of claim 8, further comprising:
prompting a user to access segments of the content through user interaction with the generated bookmarks on a graphical user interface.

15. A computer program product for intelligent web conference bookmarking, the computer program product comprising:
one or more computer-readable tangible storage media and program instructions stored on at least one of the one or more tangible storage media, the program instructions executable by a processor of a computer to perform a method, the method comprising:
parsing, by a processor, content of a web conference recording document utilizing multi-modal analysis;
deriving a social meeting bookmark model based on the multi-modal analysis to combine results of the multi-modal analysis into a matrix;
generating bookmarks of the parsed content based on the derived social meeting bookmark model and the matrix; and
storing the bookmarks and the social meeting bookmark model in a database.

16. The computer program product of claim 15, further comprising:
displaying the bookmarks on a graphical user interface of a web conference application.

17. The computer program product of claim 15, wherein the multi-modal analysis includes topic analysis and similarity analysis.

18. The computer program product of claim 15, further comprising:
generating the bookmarks at segments within the content that are within a threshold relevancy and an importance score to a user based on a user skill set.

19. The computer program product of claim 15, further comprising:
evaluating a level of relevancy of the content of the web conference recording to a user; and
assigning different colors to the bookmarks based on pre-configured ranges of relevancy and importance scores.

20. The computer program product of claim 15, further comprising:
prompting a user to access segments of the content through user interaction with the generated bookmarks on a graphical user interface.

* * * * *